(12) United States Patent
Jessen et al.

(10) Patent No.: US 10,712,259 B2
(45) Date of Patent: Jul. 14, 2020

(54) PHOTOACOUSTIC SENSOR SYSTEM AND METHODOLOGY FOR DETECTING TARGET MOLECULES

(71) Applicant: PAJ SENSOR A/S, Sønderborg (DK)

(72) Inventors: Poul Jessen, Nordborg (DK); Søren Laungaard, Virum (DK); Jan Petersen, Kgs. Lyngby (DK); Mikael Lassen, København NV (DK); David Balslev-Harder, Kgs. Lyngby (DK)

( * ) Notice: Subject to any disclaimer, the term of this patent is extended or adjusted under 35 U.S.C. 154(b) by 201 days.

(21) Appl. No.: 15/547,746

(22) PCT Filed: Feb. 1, 2016

(86) PCT No.: PCT/EP2016/052073
§ 371 (c)(1),
(2) Date: Jul. 31, 2017

(87) PCT Pub. No.: WO2016/124545
PCT Pub. Date: Aug. 11, 2016

(65) Prior Publication Data
US 2018/0024046 A1 Jan. 25, 2018

(30) Foreign Application Priority Data
Feb. 2, 2015 (DK) .................................. 2015 00058

(51) Int. Cl.
*G01N 21/17* (2006.01)
*G01N 21/85* (2006.01)

(52) U.S. Cl.
CPC ......... *G01N 21/1702* (2013.01); *G01N 21/85* (2013.01); *G01N 2021/1704* (2013.01);
(Continued)

(58) Field of Classification Search
CPC ............... G01N 21/17; G01N 21/1702; G01N 2021/1704; G01N 21/85; G01N 21/8578; G01N 2201/06113; G01N 2201/062
(Continued)

(56) References Cited

U.S. PATENT DOCUMENTS

| 4,412,445 A | 11/1983 | Spellicy |
| 6,344,647 B1 | 2/2002 | Jourdain et al. |

(Continued)

FOREIGN PATENT DOCUMENTS

| WO | 2003104767 A2 | 12/2003 |
| WO | 2007067922 A2 | 6/2007 |

OTHER PUBLICATIONS

International Search Report of PCT/EP2016/052073, dated Aug. 11, 2016, 8 Pages.
(Continued)

*Primary Examiner* — Benjamin R Schmitt
(74) *Attorney, Agent, or Firm* — David Postolski

(57) ABSTRACT

The present invention relates to a photoacoustic sensor system for detecting target molecules in air samples or compressed air samples. The photoacoustic sensor system comprises an acoustic resonator forming a cylindrical resonant cavity and an air or compressed air sampling system configured for directing a flow of air or compressed air through the cylindrical resonant cavity. The photoacoustic sensor system comprises first and second microphones for generating first and second photoacoustic signals in response to absorption of modulated light within the cylindrical resonant cavity. A light source is configured to direct a modulated light beam through the cylindrical resonant cavity of the photoacoustic spectroscopy cell.

21 Claims, 7 Drawing Sheets

(52) U.S. Cl.
CPC ............... *G01N 2021/8578* (2013.01); *G01N 2201/062* (2013.01); *G01N 2201/06113* (2013.01)

(58) Field of Classification Search
USPC ................ 73/24.01, 24.06, 632, 643, 655
See application file for complete search history.

(56) References Cited

U.S. PATENT DOCUMENTS

| | | | |
|---|---|---|---|
| 7,304,732 B1 * | 12/2007 | Polcawich | G01N 21/1702 250/339.07 |
| 8,479,559 B2 | 7/2013 | Miklos et al. | |
| 2008/0159341 A1 * | 7/2008 | Patel | B82Y 20/00 372/20 |
| 2012/0092782 A1 | 4/2012 | So | |
| 2012/0247183 A1 | 10/2012 | Rezachek | |

OTHER PUBLICATIONS

Danish Patent and Trademark Office, Danish Search Reported Corresponding to PA201500056, dated Sep. 10, 2015, 8 Pages.

* cited by examiner

PHOTOACOUSTIC SENSOR SYSTEM AND METHODOLOGY FOR DETECTING TARGET MOLECULES

This application is a national application of PCT-application PCT/EP2016/052073 filed on Feb. 1, 2016, which claims priority of Danish patent application No. PA201500058 filed on Feb. 2, 2015, both of which disclosures are incorporated herein by reference.

The present invention relates to a photoacoustic sensor system and a corresponding methodology for detecting target molecules in air samples or compressed air samples. The photoacoustic sensor system comprises an acoustic resonator forming a cylindrical resonant cavity and an air or compressed air sampling system configured for directing a flow of air or compressed air through the cylindrical resonant cavity. The photoacoustic sensor system comprises first and second microphones for generating first and second photoacoustic signals in response to absorption of modulated light within the cylindrical resonant cavity. A light source is configured to direct a modulated light beam through the cylindrical resonant cavity of the photoacoustic spectroscopy cell.

BACKGROUND OF THE INVENTION

Oil contaminants in compressed air, even in small concentration levels at sub-ppm levels, can be disastrous and health threatening for a vast variety of industries such as food and beverage processing, pharmaceutical manufacturing and packaging, chemical and petrochemical processing, semiconductor and electronics manufacturing, the medical sector, automotive paint spraying, textile manufacturing, amongst several others.

The International Standards Organization (ISO) established the 8573 compressed air quality standard in 1991 to govern compressed air system component selection, design and measurement. ISO 8573 is a multi-part standard, with Part 1 classifying contaminant type and assigning air quality levels, and Parts 2 through 9, define testing methods to accurately measure a full range of contaminants within the end user's facility. ISO 8573.1 identifies three primary contaminant types as prevalent in a compressed air system: Solid particulates, water and oil (in both aerosol and vapour form). Each is categorized and assigned a quality class ranging from class 0, the most stringent, to Class 9, the most relaxed.

The present invention comprises novel photoacoustic sensor system that in certain embodiments has the ability to, in real time, detect and measure oil contamination in vapour, aerosol and liquid form in compressed air systems in accordance with class 0 requirements of the ISO 8573 standard. The photoacoustic sensor system may in certain embodiments achieve class 0 accuracy according to the ISO 8573 standard as tested and verified by the Danish National Metrology Institute (Dansk Fundamental Metrologi A/S—"DFM") and the Dutch National Metrology Institute (VSL).

High purity compressed air is a frequently used source of energy/power in industrial environments and a key element in a large variety of industries. High purity compressed air is for example used in pneumatics for driving different types of valves and actuators in the automotive and process industries. High purity compressed air is also used as a gas duster for cleaning electronic components in the electronics and semiconductor industry. Air jet weaving and air jet spinning use compressed air for pick insertion and yarn consolidation in the textile industry. Other applications of compressed air include automotive industry spray paint booths, tobacco industry air washers, hospital surgery and nursery rooms, breathing air in hospitals, photographic film manufacturing plants, and clean rooms. In addition to high purity compressed air requirements in the above mentioned industries, clean compressed air is vital for maintaining cleanliness and hygiene in food and beverage industries where contaminations can lead to severe health issues. Compressed air provides the energy source for pneumatic conveyers that transport liquids, powders and moisture sensitive product throughout the plants. Compressed air provides power for pneumatically operated tools and equipment that renders meat products, aerates liquids and mixes granular ingredients. It is used to package, wrap, seal, palletize and label food products prior to storage or shipment. The wide-spread use of compressed air has resulted in increased contamination vulnerability and the industry has as a consequence been subject to strict regulation and standards. In this context, ISO 8573 is the most important international standard. The standard specifies quality requirements for all compressed air—and part 1 specifies the purity classes of compressed air with respect to particles, water and oil. The standards vastly increase the operating and maintenance costs of compressed air systems along with the tremendous risks associated with an air contamination.

A compressed air system can have various different types of contaminations, and these can generally be attributed to the following sources:

1. The quality of air being drawn into the system: Atmospheric air in an industrial environment typically contains 140 million dirt particles for every cubic metre of air. 80% of these particles are less than 2 microns in size and are too small to be captured by the compressor intake filter and other inline filters, therefore passing directly into the compressed air system. These often contain hydrocarbon particles and aerosols.
2. The type and operation of the air compressor: The air compressor itself can also add contamination, from wear particles to coolants and lubricants. Most air compressors use oil in the compression stage for sealing, lubrication and cooling. During operation, lubricating oil is carried over into the compressed air system as liquid oil and aerosols. This oil mixes with water vapour in the air and is often very acidic, causing damage to the compressed air storage and distribution system, production equipment and final product.
3. Compressed air storage and distribution systems: The air receiver and system piping are designed to store and distribute the compressed air. As a consequence they also store the large amounts of contamination drawn into the system. Additionally, piping and air receivers also cool the moist compressed air forming condensate that causes damages and corrosion.

Failure to detect oil contamination, or other types of contaminants, in due time can cause significant health problems and lead to severe economic impacts. Examples are:

1. Increase in plant maintenance costs: Corrosion within compressed air storage vessels and the air distribution system, blocked or damaged valves, filters, cylinders, air motors and air tools, damaged production equipment.
2. Unscheduled plant shutdown: Caused by equipment and part failures, leading to loss of production capacity.
3. Product contamination: Leading to loss of production batches and economic losses.
4. Reduced Product Quality: Contaminated products if released into the market will not only result in reduced brand image, and conflicts with regulatory bodies, but in the case of food processing and pharmaceutical industries could severely affect public health.

5. Risk to Human Life with Severe Civil Liabilities: Oil contaminants in compressed air for patients in hospitals can have life threatening impacts for patients.

The present photoacoustic sensor system may be configured to detect various types of oil contamination and therefore eliminate at least some of these risks and impacts. To achieve these goals, the present photoacoustic sensor system may for example be integrated with SCADA and Distributed Control Systems of the plants.

Hence, the present photoacoustic sensor system and methodology may be adapted for the detection of oils in aerosol, vapour and liquid form in compressed air. Some embodiments of the photoacoustic sensor system may be configured to detect target molecules comprising oil contaminants in compressed air with ISO 8573 class 1, or better, sensitivity. The present photoacoustic sensor system and methodology may also be adapted to detect other types of target molecules such as hydrocarbons, non-hydrocarbons and trace gasses. While photoacoustic spectroscopy technologies are well known they have generally not been satisfactory in terms of accuracy, sensitivity, reproducibility and traceability. The same applies for other technologies, for example, thermal and photo ionization technologies. A key reason is that these prior art technologies are prone to background noise.

The present photoacoustic sensor system and methodology is capable of eliminating, or at least markedly suppressing, this noise while enhancing various important detection parameters. The present photoacoustic sensor system and methodology may include one or several new research-based sensing principles and sophisticated new photonics and optical spectroscopy with noise cancellation technology and flow noise immunity designs, optimised insulation, coatings and sampling etc. as discussed in further detail below.

U.S. Pat. No. 5,986,546 describes an oil contamination detection assembly for a vehicular pneumatic brake system having a supply of air contaminated with oil. The principle behind this detection is based on the change in resistance of a resistor when accumulating a layer of oil contaminating the air. Since this is used in a vehicular maintenance system, it does not conform to ISO standards, and this principle produces detection that is far less accurate than industrial requirements.

U.S. Pat. No. 5,730,942 describes a system for measuring foreign substances such as oil in a gas stream, by introducing a probe that is based on change in resistance/conductivity. This patent is a contact type measurement that has relatively poor sensitivity and repeatability and hence does not conflict with this innovation.

U.S. Pat. No. 4,732,861 describes a method of detecting oil aerosol in an air flow, by passing the air flow through a space between an electrode and an electrically conductive catalyst, causing electrical discharge between the electrode and the catalyst so as electrostatically to precipitate oil from the air flow on to the catalyst, terminating the discharge, stopping the air flow, heating the catalyst in substantially stagnant air to a temperature at which catalytic combustion of the precipitated oil occurs, and sensing heat generation due to said catalytic combustion to produce an output signal indicative thereof.

U.S. Pat. No. 7,343,781 describes a system for detecting fine liquid like oils and particles in a gas system comprising of a compressor and at least two gas handling devices. This patent does not describe any sensor element but only describes the system and arrangement for real-time measurement.

EP 2 373 991 describes a system based on the photo ionisation technology.

The present photoacoustic sensor system and methodology may be a valuable instrument for the implementation of critical and continuous monitoring of contamination of compressed air or air. The present photoacoustic sensor system may for example comply with certain requirements for microbial monitoring and enabling a proactive intervention.

SUMMARY OF THE INVENTION

A first aspect of the invention relates to a photoacoustic sensor system for detecting target molecules in air samples or compressed air samples. The photoacoustic sensor system comprising a photoacoustic spectroscopy cell which comprises:

an acoustic resonator comprising an upper circular plate and a lower circular plate separated by a predetermined distance or height to form a cylindrical resonant cavity, an air or compressed air sampling system configured for directing a flow of air or compressed air through the cylindrical resonant cavity; and a first microphone arranged substantially at a centre of one of the upper and lower circular plates for generating a first photoacoustic signal in response to absorption of modulated light within the cylindrical resonant cavity and a second microphone arranged at a circumferential edge of the one of the upper and lower circular plates for generating a second photoacoustic signal in response to the absorption of modulated light within the cylindrical resonant cavity. The photoacoustic sensor system further comprises a light source configured to direct a modulated light beam through the cylindrical resonant cavity of the photoacoustic spectroscopy cell.

The present photoacoustic sensor system is based on photoacoustic spectroscopy (PAS) technology. The spectroscopic approach provides the advantage that the photoacoustic sensor system may be absolute calibrated at national metrology institutes (NMI's) using reference gases. Two NMI's have been involved in the development of the present photoacoustic sensor system: VSL (Netherlands) and DFM (Denmark) and verified the accuracy of the photoacoustic sensor system. Generally, Photo Acoustics (PA) techniques are based on a detection of sound waves or sound pressures generated due to absorption of modulated optical radiation or modulated light. One or more microphones may be utilized to detect or measure sound pressures or acoustic waves that appear after the modulated light or radiation is absorbed by an air sample within an acoustic resonant cavity and converted to local heating via collisions and de-excitation. The magnitude of a photoacoustic signal is generally given by:

$$S_{PA} = S_m P F \alpha$$

where P is the power of the incident optical radiation, $\alpha$ is the absorption coefficient, which depends on the total number of target molecules per $cm^3$ and the absorption cross section, $S_m$ is the sensitivity of the microphone. F is a photoacoustic cell-specific constant which depends on the geometry of the acoustic resonant cavity or cell. It is evident that the magnitude of the generated photoacoustic signal is proportional to a density of the target molecules in the air sample being measured. Consequently, the PAS technique is capable of measuring the absorption directly, rather than calculating it from the transmission.

In accordance with one embodiment of the present photoacoustic sensor system, the first photoacoustic signal and the second photoacoustic signal are subtracted to produce a photoacoustic output signal with enhanced signal-to-noise ratio relative to each of the first and second photoacoustic signals as described in additional detail below with reference to the appended drawings. The first and second microphones may possess a matched frequency response, at least over a predetermined frequency range of interest, to further improve noise suppression in the photoacoustic output signal caused by the subtraction of the first and second photoacoustic signals. The predetermined frequency range in which the microphone frequency responses are matched may at least comprise a fundamental resonant frequency of the cylindrical resonant cavity.

The target molecules may comprise various substances for example exhaust gas molecules. The exhaust gas molecules may comprise at least one of: $\{NO_x; SO_x; CO_x\}$. The target molecules may comprise one or more of non-hydrocarbons, hydrocarbons and trace gasses. $N_2$ is yet another type of target molecules. The wavelength of emitted light of the modulated light beam may be adapted or adjusted to any of these target molecules in a well-known manner.

A modulation frequency of the light source may be set or adjusted to substantially a fundamental resonant mode or frequency of the cylindrical resonant cavity. The light source may be amplitude modulated for example by amplitude modulating a drive current of a laser source or LED source. The fundamental resonant mode or frequency of the cylindrical resonant cavity will depend on the dimensions of the cavity and may vary depending on requirements of a particular application. The fundamental resonant frequency of the cylindrical resonant cavity may in some embodiments lie between 1 kHz and 10 kHz.

A second aspect of the invention relates to a method of detecting target molecules in air or compressed air samples by photo acoustic spectroscopy, said method comprising;
 a) directing a flow of air or compressed air through a cylindrical resonant cavity of an acoustic resonator,
 b) generating a modulated light beam at a predetermined wave length by a light source,
 c) directing the modulated light beam through the cylindrical resonant cavity of the photoacoustic spectroscopy cell to absorb modulated light in the target molecules,
 d) amplifying sound waves of a photoacoustic signal generated in response to the absorption of the modulated light by excitation of a fundamental resonant mode or frequency of the resonant cavity,
 e) detecting a first sound pressure component of the photoacoustic signal at a first position of the cylindrical resonant cavity,
 f) detecting a second sound pressure component of the photoacoustic signal at a second position of the cylindrical resonant cavity.

Various exemplary embodiments of the present photoacoustic sensor system, and corresponding methodologies of detecting target molecules in air or compressed air samples, are set out in the below-appended dependent patent claims.

A third aspect of the invention relates to a sensor system and method for monitoring the content of oil in air, or compressed air as per ISO 8573 class 0, characterised in that the sensor system is comprising an air or compressed air heated sampling system, and connected thereto, a laser source where the output beam is collimated with an aspheric lens and high reflection mirrors multi passing a photo acoustics spectroscopy cell configuration, an inbuilt noise cancellation technique based on a circular shaped acoustic resonator equipped with two or more microphones operating in a fundamental membrane mode as illustrated in FIG. 1-3, and with a buffer zone surrounding the acoustic resonator for making the sensor flow immune up to at least 2 L/min, the sensor being configured for providing and analysing electronic signals indicative of the content, temperature, optical power, air flow and pressure.

According to some embodiments of the invention, the sensor system may be adapted to eliminate micro organic material on surfaces in the sensor system by UV light and a photo catalytically active titanium dioxide coating.

A fourth aspect of the invention relates to a photo acoustic spectroscopy system and method of noise cancellation, as illustrated in FIG. 1. The photo acoustic sensor system includes a noise cancellation technique by exploiting two microphones where one is placed in the centre of the circular shaped acoustic resonator and one is placed on the edge of the ring resonator in the acoustic node, and a buffer zone surrounding the acoustic circular resonator for making the sensor flow immune up to at least 2 L/min, as illustrated in FIGS. 1 and 2. The two microphones are inside the acoustic resonator therefore they both will be influenced by the phase-shift associated with the acoustic resonator, however only the microphone in the centre will feel the full amplitude of the acoustic signal, while the microphone in the node ideally measures a zero amplitude, (thus no PA signal). The two-microphone design uses the difference between the microphones to suppress any in-phase background noise signal and hence enhances the S/N ratio as illustrated in FIG. 6. Different shapes of the acoustic resonator plates gives a higher/lower response due to the better overlap with the excited fundamental membrane mode, thus giving a higher/lower Q-factor of the acoustic resonance. A circular shape has been found to provide the highest response.

BRIEF DESCRIPTION OF THE DRAWINGS

In the following, preferred embodiments of the present invention are described in more detail with reference to the appended drawings, wherein.

DETAILED DESCRIPTION OF EMBODIMENTS

Figure 1:
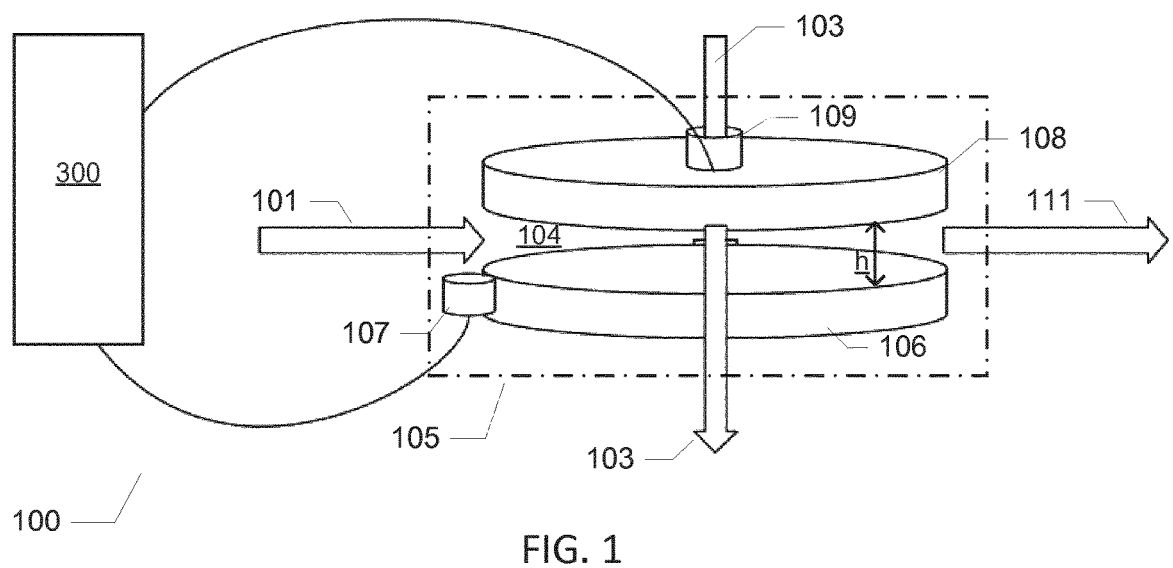
FIG. 1 illustrates schematically an acoustic resonator of a photoacoustic spectroscopy cell in accordance with various embodiments of the invention.

In the following various exemplary embodiments of the present photoacoustic sensor system are described with reference to the appended drawings. The skilled person will understand that the accompanying drawings are schematic and simplified for clarity and therefore merely show details which are essential to the understanding of the invention, while other details have been left out. Like reference numerals refer to like elements throughout. Like elements will, thus, not necessarily be described in detail with respect to each figure.

Optical sensors based on absorption spectroscopy are well established for monitoring the presence of molecular species or target molecules. However, these sensors have not been used before for measuring ISO 8573 Class 1 oil contamination in air samples or compressed air samples as described below for the present photoacoustic sensor system. The absorption spectroscopy unit may comprise an integral laser system as light source to produce very precise measurements. Lasers possess certain advantages compared to thermal sources by having higher spectral brilliance, better beam quality/power and novel sample interfaces. Until recently, the most promising tuneable mid-infrared laser technology involved parametric frequency conversion. The complexity and cost of these systems have hindered their wider commercial application. The recent discovery of quantum cascade devices has offered a way to realize high-gain mid infrared lasers that operate at room temperature and can be designed to operate in a specific spectral region. In addition, such high-gain mid-infrared lasers are characterized by being small, very power efficient and provide relatively simple thermal management. This type of monitoring relies on the distinct chemical "fingerprints" associated with each molecule. Thus, each target molecule in the air or compressed air sample can be detected and distinguished with great sensitivity. This requires knowledge of the molecular "fingerprints" of the target molecule or molecules which are the absorption feature characteristics for each target molecule. It is preferred to have a detailed knowledge of the wavelength of the infrared molecular ro-vibrational transitions to be monitored together with line intensities as well as pressure and temperature dependence of the line width.

The below-described embodiment of the present photoacoustic sensor system has been tested on a polluted air compressor system containing oil defined according to ISO 8573-1 as all hydrocarbons with six or more carbon atoms per molecule within the meaning of that ISO standard. The following organic compound classes (hydrocarbons) are therefore "oils" within the meaning of the standard: Solvents (e.g. toluene and hexane), VOCs (Volatile Organic Compounds), adhesives thread and surface sealants, fragrances (air fresheners, perfumes, etc.), detergents/cleaning agents.

Figure 4:
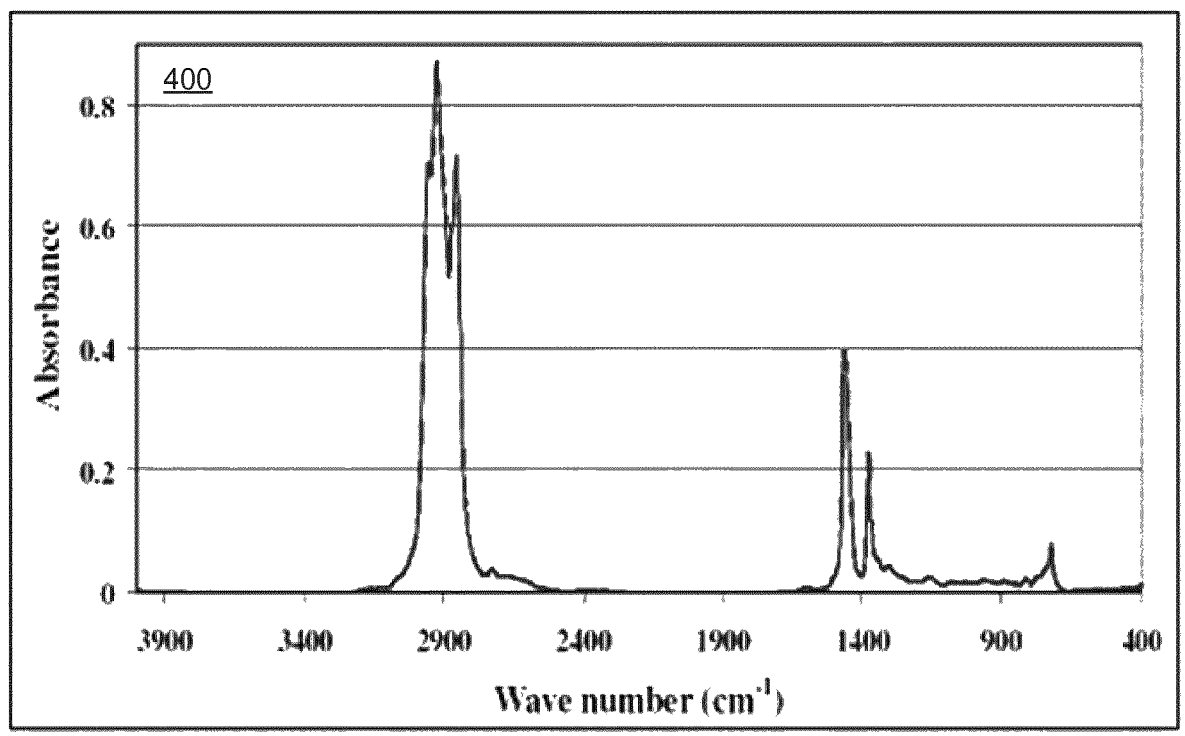
FIG. 4 shows a graph of a typical measured FTIR spectrum of a mineral oil.

A typical Fourier transform infrared (FTIR) spectrum of a mineral oil is shown in FIG. 4. Reaching class 1 of ISO 8573 basically restricts the possible spectral detection ranges to 2900 cm-1 and 1400 cm-1. The ratio of the peak absorption of these bands is typically 2½:1. Since the expected types of oils often have long chain alkyl groups, the expected oil types will have absorption at approximately these wave numbers. However, calibration must often be made using the targeted oil, molecule or media.

The present photoacoustic sensor system may combine various new research-based sensing principles and sophisticated photonics such as spectroscopy with innovative noise cancellation technology and noise immunity design, optimised insulation, coatings and sampling for example as outlined below.

Figure 2:
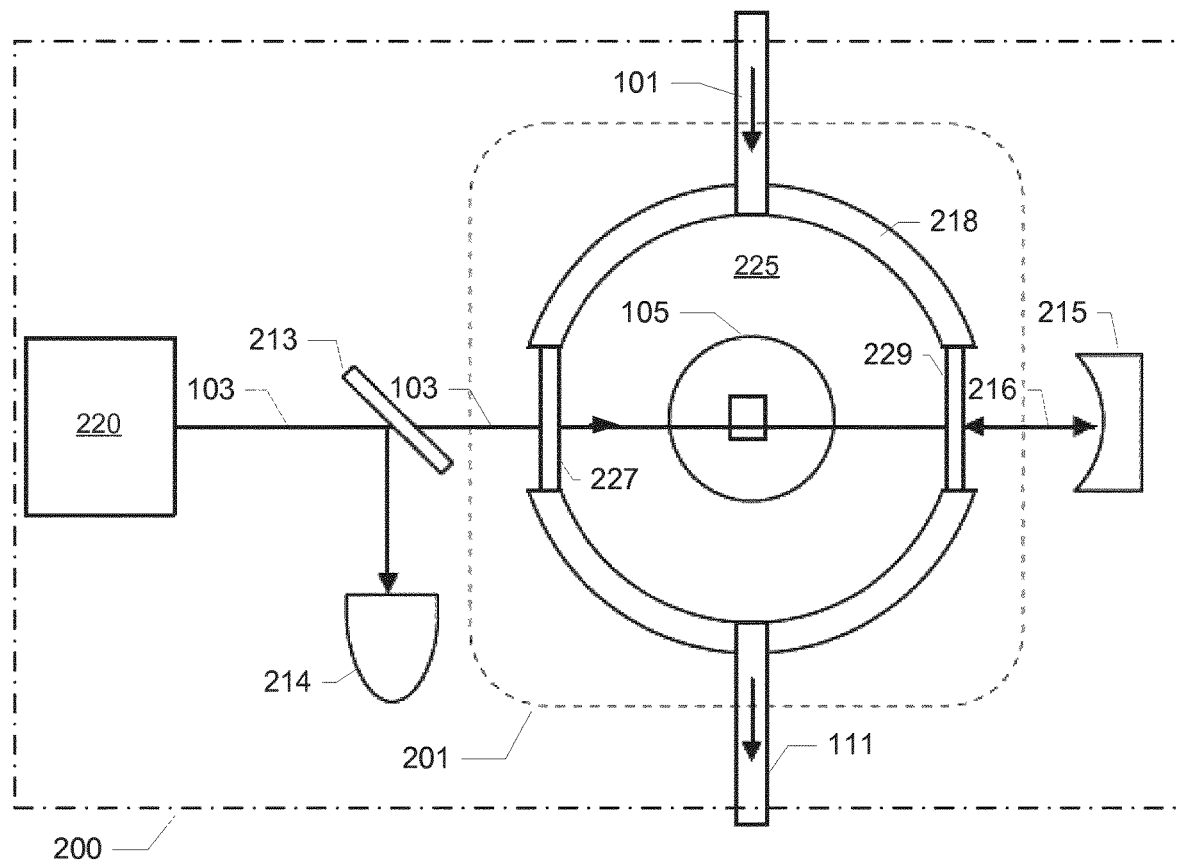
FIG. 2 shows a simplified schematic drawing of a photoacoustic sensor system in accordance with a first embodiment of the invention.

FIG. 2 shows a simplified schematic cross-sectional view or drawing of a photoacoustic sensor system 200 in accordance with a first embodiment of the invention. The photoacoustic sensor system 200 comprises a light source 220 for example a laser source such as the previously discussed tuneable high-gain mid infrared laser. The light source 220 produces an amplitude modulated light beam 103 which may be collimated by a lens 213 before being transmitted to a photoacoustic spectroscopy cell 201 (PAS cell) as shown. The modulated light beam 103 propagates to a beam splitter 213 and further through a first optical window 207 and through a resonant cavity 104 of an acoustic resonator 105 of the photoacoustic spectroscopy cell 201. The resonant cavity 104 is preferably shaped as a cylindrical resonant cavity or chamber 104 as illustrated in additional detail on FIG. 1. The photoacoustic sensor system 200 may comprise an optional optical power measurement device 214 to monitor the energy or power of the generated light beam 103 via a side-beam provided by the beam splitter 213. To increase the absorption length of the photoacoustic spectroscopy cell 201 and hence the magnitude or level of the first photoacoustic signal, and of any further photoacoustic signal(s), a multi-pass configuration may be utilized for the photoacoustic sensor system 200 as schematically illustrated on FIG. 2. The multi-pass application of the light beam 103 is achieved by the use of a second optical window 209 and a high reflection mirror 215 where the latter may possess an optical reflection larger than 95% or 99%. The second optical window 209 may be arranged substantially oppositely to the first optical window 207 such that the incoming modulated light beam 103 is passed through the cylindrical resonant cavity 104 and then further through the second optical window 209 and to the high reflection mirror 215. A reflected modulated light beam 216 is transmitted back through the second optical window 209 and further through the cylindrical resonant cavity 104 such that the modulated light beam in effect is multi-passed through the photoacoustic spectroscopy cell 201 and cylindrical resonant cavity 104. Each of the first and second optical windows 207, 209 may comprise an anti-reflection coated window. Various coatings of the laser and first and second optical windows 207, 209 for higher optical power may be applied as further ways of optimizing the sensor accuracy.

There are several noticeable advantages associated with the multi-passing of the modulated light beam 103: One advantage is that the interaction between the laser beam and the targeted oil molecules, or other types of target molecules, will be enhanced such that the magnitude or level of the resulting first, and possibly second, photoacoustic signal is amplified to improve measurement sensitivity. The PAS cell is preferably pressure and temperature controlled. If the light source 220 comprises a laser source, the latter is preferably temperature controlled with a Peltier element. The modulation of the light intensity of the light source 220 may for example be controlled by amplitude modulating a drive current of the laser where a square-wave may be applied to a laser controller. The modulation frequency of the light intensity is preferably adjustable or programmable to allow matching the modulation frequency to a particular fundamental resonant mode or frequency of the cylindrical resonant cavity 104. The skilled person will appreciate that the fundamental resonant mode or frequency depends on the chosen geometry and dimensions of the cylindrical resonant cavity as discussed in further detail below.

Figure 3A:
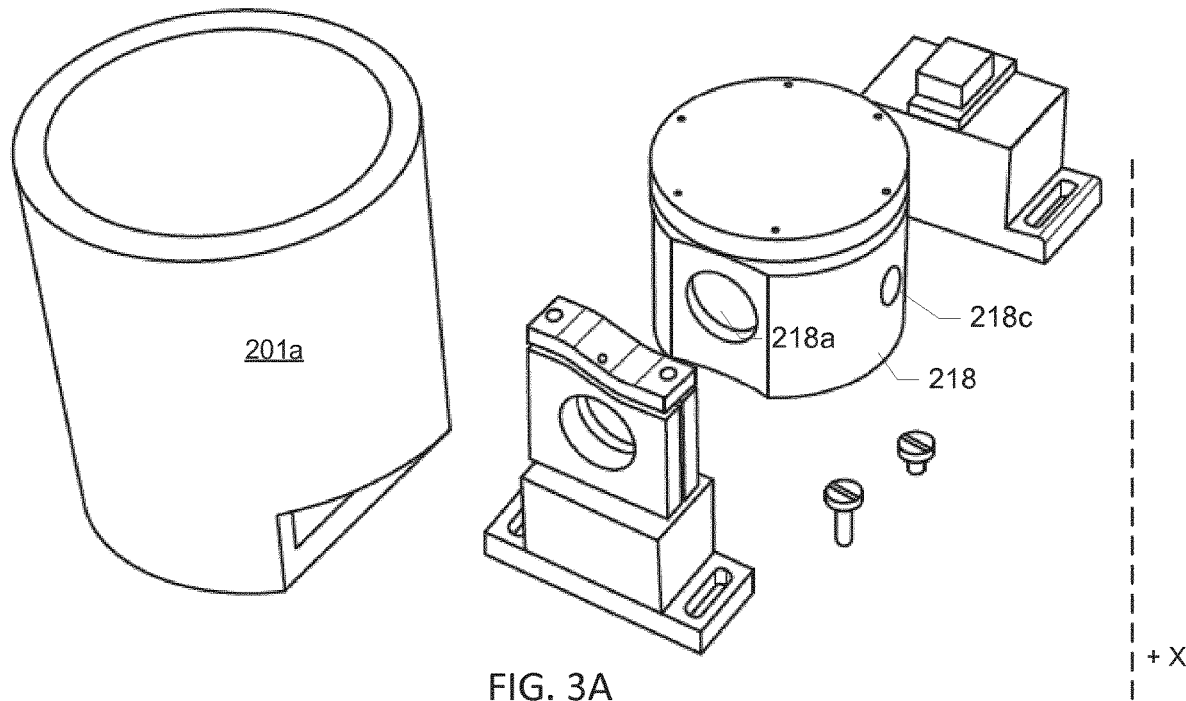
FIG. 3A shows a simplified perspective drawing of various components of the photoacoustic sensor system in accordance with a first embodiment of the invention.

The present embodiment of the photoacoustic spectroscopy cell 201 has been designed for flow noise immunity using advanced Computational Fluid Dynamics (CFD) and COMSOL analysis and algorithms. The photoacoustic sensor system 200 is capable of handling air flows up to at least 2.0 l/min without adding flow noise to the photoacoustic signal or signals. In order to optimize the air flow and geometry of the cell 201, various simulations have been performed. An advantageous characteristic of the sensor system 200 is therefore its flow noise immunity at flows as high as 2 l/min. The photoacoustic spectroscopy cell 201 comprises a cylindrical housing or casing 218 (refer to FIG. 3A) which inter alia acts as a noise buffer zone. The cylindrical housing 218 comprises suitable apertures 218a for mounting at least one of the first and second optical windows 227, 229 and gas inlet and outlet ports 218c for passing the flow of air or compressed air through the casing 218. Certain embodiments of the photoacoustic spectroscopy cell 201 may further be surrounded by an outer thermal shield 201a acting a thermal insulator for photoacoustic spectroscopy cell 201 against the external environment.

The acoustic resonator 105 is arranged within the cylindrical housing or casing 218 as illustrated on FIG. 2. The cylindrical housing 218 acts as a buffer zone for acoustic flow noise and absorption losses in the optical windows 227, 229. The air samples or compressed air samples to be tested are transmitted into the interior volume 225 of the cylindrical housing or casing 218 of the photoacoustic spectroscopy cell 201 via an air/gas inlet tube or pipe 101. The air samples or compressed air samples are led through the cylindrical resonant cavity (104 of FIG. 1) formed in-between upper and lower circular plates 108, 106, respectively. The air samples or compressed air samples are subsequently expelled through a gas outlet tube or pipe 111. The cylindrical housing or casing 218 is preferably air tight to prevent leakage to the surrounding environment. The cylindrical housing shape of the photoacoustic spectroscopy cell 201 is advantageous because it facilitates air/gas circulation interior volume 225 and therefore operates to suppress or eliminate turbulent air flow. The flow of air or compressed air through the interior volume 225 is preferably kept substantially laminar for example by the dimensions and shape of the cylindrical housing or casing 218.

The photoacoustic sensor system 200 may comprise the below-discussed noise cancellation mechanism which exploits several photoacoustic signals generated by two or more microphones located at different sound field positions of an acoustic resonator 105 of the photoacoustic spectroscopy cell 201 as illustrated on FIG. 1. The acoustic resonator 105 comprises a first microphone 109 arranged substantially at a centre of one of the upper and lower circular plates 108, 106 for generating a first photoacoustic signal in response to the previously discussed absorption of modulated light within the cylindrical resonant cavity 104. The photoacoustic spectroscopy cell 201 additionally comprises a second microphone 107 arranged at a circumferential edge of the lower circular plate 106 for generating a second photoacoustic signal in response to the absorption of modulated light within the cylindrical resonant cavity 104. The skilled person will appreciate that the first microphone 109 is placed at, or in, an anti-node of the fundamental resonant frequency of the cylindrical resonant cavity 104 and therefore senses a maximum sound pressure of the sound field. On the other hand, the second microphone 107 is placed at, or in, a node of the fundamental resonant frequency of the cylindrical resonant cavity 104 and therefore senses a minimum, for example zero, sound pressure of the sound field. The skilled person will understand that the acoustic resonator 105 may comprise a third microphone arranged substantially at a center of the lower circular plate 108 to produce a third photoacoustic signal to be combined with the first photoacoustic signal and therefore further improve a signal-to noise ratio of the combined signal. Likewise, the acoustic resonator 105 may comprise one or more additional microphones arranged at the circumferential edge of the upper and/or lower circular plates for picking-up additional photoacoustic signal(s).

The cylindrical resonant cavity 104 as illustrated on FIG. 1 may be formed between, or comprise, the previously discussed upper and lower circular plates 108, 106 separated by an intervening air gap, h. Various dimensions of these circular plates 108, 106 and air gap heights may be utilized depending on specific requirement of an application. The radius of each of the upper and lower circular plates 108, 106 may be between 20 mm and 60 mm. The height or distance, h, between the upper and lower circular plates may lie between 4 mm and 10 mm. The dimensions of the upper and lower circular plates 108, 106 may be substantially identical. The upper and lower circular plates 108, 106 are preferably aligned below each other. In one embodiment of the cylindrical resonant cavity 104, each of the circular plates 108, 106 has a radius of 30 mm and the height of the intervening air gap is between 5 and 8 mm. The first and second microphones 109, 107 are both subjected to the sound waves or pressure generated within the resonant cavity 104 in response to the modulated optical radiation and therefore both influenced by the phase-shift associated with the resonator operation. However, only the first microphone 109 will be subjected to the full amplitude of the acoustic wave or signal within the cavity 104, while the second microphone at, or in the node, ideally detects or measures zero amplitude of the sound pressure. The dual-microphone design uses this difference between the sound pressures in the anti-node and node of the sound field to suppress any in-phase background noise signal.

Figure 6:
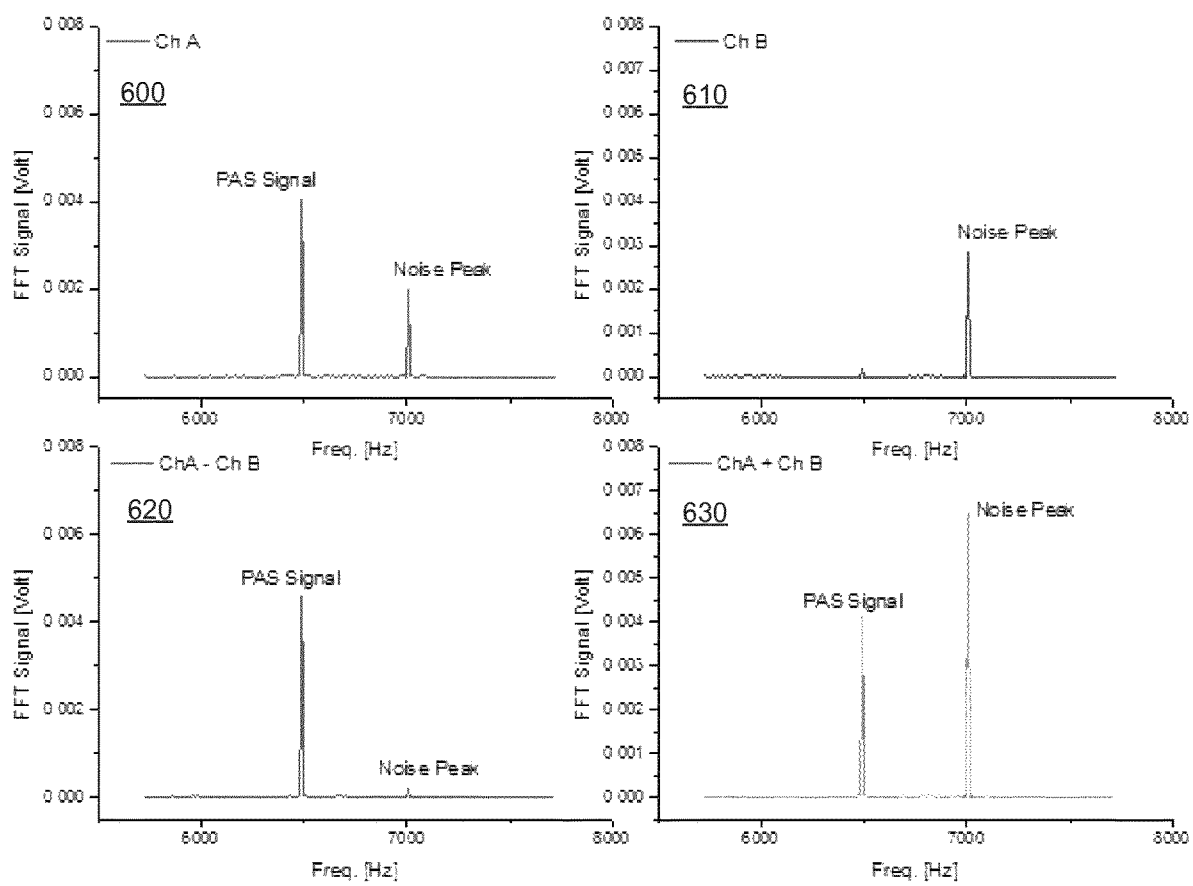
FIG. 6 shows four graphs of experimentally measured frequency spectra of photoacoustic signals captured by two different microphones of the acoustic resonator during photoacoustic excitation of analyzed air samples within a resonant cavity.

FIG. 6 shows various experimentally measured frequency spectra of the first and second photoacoustic signals captured or detected by the first and second microphones 109, 107 during photoacoustic excitation of the air samples within the cylindrical resonant cavity 104. The first spectrum depicted on graph 600 shows a measured frequency spectrum of the first photoacoustic signal (PAS signal) generated by the centrally arranged first microphone. The first spectrum exhibits a signal peak at approximately 6500 Hz which approximately corresponds to the modulation frequency of the light beam and also to the fundamental resonant frequency of the cavity 104 in the present embodiment of the invention. A substantial noise component (Noise peak) is also present in the first spectrum depicted on graph 600. The second spectrum depicted on graph 610 shows a measured frequency spectrum of the second photoacoustic signal generated by the second microphone 107 located at the acoustic node of the sound field. The second spectrum exhibits a near zero level or amplitude of the second photoacoustic signal. However, a substantial noise component (Noise peak) is still present in the second spectrum depicted on graph 610. The third spectrum depicted on graph 620 shows the result of a subtraction of the first and second measured frequency spectra 600, 610. It is evident that the photoacoustic signal (PAS signal) is left essentially un-attenuated by the subtraction operation while the noise component has been markedly suppressed or attenuated in the differential spectrum on graph 620. Consequently, the subtraction of the first and second photoacoustic signals generated by the first and second microphones 109, 107 generates a resulting photoacoustic output signal with significantly enhanced signal-to-noise ratio relative to the signal-to noise ratio of each of the first and second photoacoustic signals. The first and second microphones 109, 107 may possess a matched frequency response, at least over a predetermined frequency range, to improve the noise suppression achieved by the subtraction of the first and second photoacoustic signals. The predetermined frequency range where the microphone responses are matched may at least comprise the fundamental resonant frequency of the cavity 104. The sound pressure level difference between the first and second microphones 109, 107 in the predetermined frequency range may for example be less than +/−2 dB. The fourth spectrum depicted on graph 630 shows the result of an addition of the first and second measured frequency spectra 600, 610. It is evident that the photoacoustic signal (PAS signal) is left essentially un-attenuated by the addition or summation operation while the noise component has been markedly amplified in the summed frequency spectrum on graph 630.

Different shapes of the upper and lower plates 108, 106 of the acoustic resonator 105 lead to a higher or lower resonant response due to the better overlap with the excited fundamental resonant mode resulting in a higher or/lower Q-factor of the fundamental acoustic resonance. When vibrating in the fundamental resonance mode, the upper and lower plates act much like monopole sources which radiate sound power very efficiently. The inventors have carried out various acoustic simulations to determine the optimal shape of these resonator plates with the best overlap with the excited acoustic resonant mode. A substantially circular shape of the upper and lower plates 108, 106 has been found to provide the highest Q factor. Each of the upper and lower plates 108, 106 may for example comprise or be silicon plates and may comprise suitable surface passivation layers. Silicon plates can readily be fabricated with very plane surfaces leading to small acoustic absorption and acoustic losses to provide a large Q value at the fundamental resonant frequency of the acoustic resonator 105. The inventors have experimentally demonstrated Q values larger than 40 for such a silicon plate based acoustic resonator. However, alternative embodiments of the acoustic resonator 105 may use similar dimensioned plates formed in aluminum or stainless steel.

The frontal portion or sound port of the first microphone 109 may protrude through a through-going central cut-out or aperture formed in the upper plate 108, or a central cut-out or aperture formed in the lower plate 106, to sense the photoacoustically induced sound pressure within the resonant cavity 104. As previously discussed, the second microphone 107 may be positioned anywhere along the circumferential edge of the lower circular plate 106. The second microphone 107 may of course alternatively be positioned along the circumferential edge of the upper circular plate 108 or be arranged along a horizontal path at the circumferential edges between the upper and lower plates because the sound field is approximately zero at these locations at the fundamental resonance mode check.

The photoacoustic spectroscopy cell 201 may comprise a self-cleaning feature invoked by heating the cell 201 to a temperature of 60-70° C. or even higher. The photoacoustic spectroscopy cell 201 may be further refined by including further self-cleaning capabilities such as a titanium dioxide ($TiO_2$) coating and UV illumination of the surfaces of the sensor system ensuring a cleaner surface for long-term stability in terms of precision and lower running costs.

Figure 5:
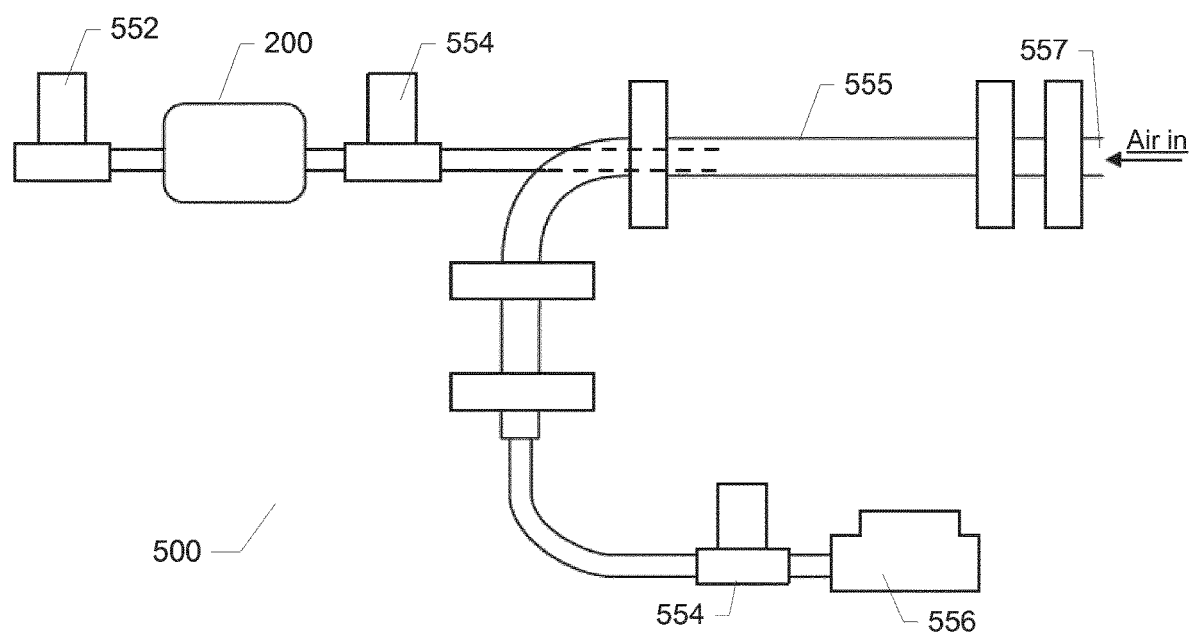
FIG. 5 shows a simplified schematic drawing of an advanced air/gas sampling system for application in various photoacoustic sensor systems.

Some embodiments of the photoacoustic sensor system 200 may include an advanced air/gas sampling system 500 through CFD analysis and algorithms as schematically illustrated on FIG. 5. The air/gas sampling system may for example comprise a mechanism and components for obtaining the desired air or compressed air samples with minimal impact on the overall flow pattern of the air or compressed air by using a bypass method. The air/gas sampling system may include a straightener which has a honeycomb structure to minimize lateral gas velocity components. For certain compressed air systems such a straightener is needed to warrant isokinetic sampling. The air sampling system may be realized according to ISO-8573 and the products specifications. Incoming gas/air or compressed gas/air flows enters through air inlet 557 and flows through gas tube 555. In order to protect the sensor system from sudden pressure increases, pressure regulator(s) 552 can be integrated. In order to achieve the same speed, the desired flow rate through the probe and the system can be controlled, for example by using one or more mass flow controllers 554. The air/gas sampling system may further include a suitable pump 556. The inventors have built and tested an advanced air/gas sampling system following these design proposals and a linear dependency between a lock-in amplifier signal and the amount of substance fractions or concentrations of the target molecules in the air samples was observed. Thus, confirming the proper functioning of the sampling system.

Figure 3B:
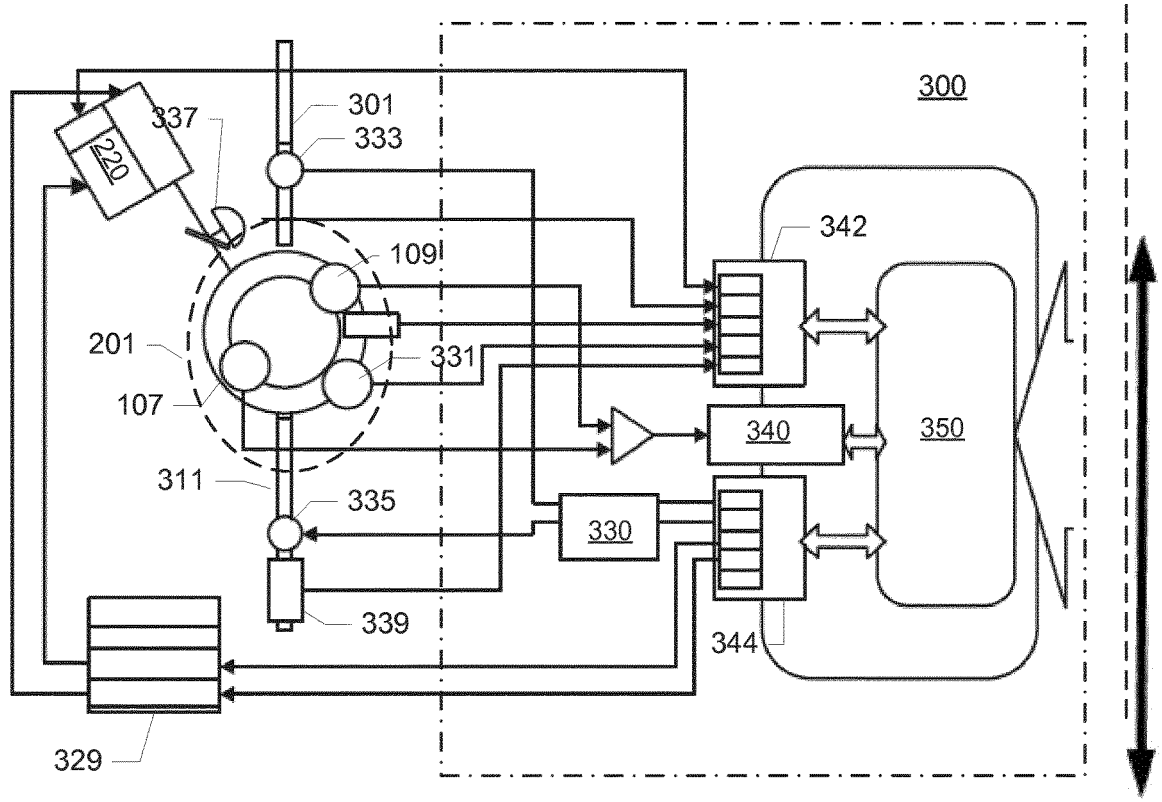
FIG. 3B shows a simplified schematic drawing of a photoacoustic sensor system comprising a data acquisition and control system in accordance with a second embodiment of the invention.

Some embodiments of the photoacoustic sensor system 200 may include a data acquisition and control system 300 as schematically illustrated on FIG. 3B. The data acquisition and control system 300 may comprise various electronic hardware and software building blocks or components and be integrated seamlessly with the previously discussed components of the photoacoustic sensor system 200. Appropriately configured or programmed FPGA's and/or microprocessors 350 (subsequently denoted a "Processing-unit" or PU) may be utilized to control the photoacoustic sensor system 200 and store acquired data, in particular the first and second photoacoustic signals, in suitable memory devices such as hard-drives or semiconductor memory.

The data acquisition and control system 300 may be configured to digitally process the acquired data and to, display, broadcast and/or store the processed data. The PU 350 may be configured, or programmed via a suitable application program comprising executable program instructions for the microprocessor, to control one or more parameters of the photoacoustic sensor system 200. The PU 350 may store various default settings of the one or more parameters of the photoacoustic sensor system 200. Exemplary components or parts of the system 200 that may be controlled by the PU 350 include: the amplitude modulation of the laser current, control of a laser temperature, control of a temperature of the photoacoustic spectroscopy cell 201, control of the gas pressure and air flow of the photoacoustic spectroscopy cell 201, e.g. by control of input and output valves 333, 335, respectively. Properties of these controlled elements may be monitored by sensors for temperature, pressure and flow. The data acquisition and control system 300 may comprise one or several A/D converters 342, 340 connected respective ones of the various sensors, such as the first and second microphones 107, 109, a flow sensor 339 and the photodetector 337, for sampling and digitizing respective ones of the generated sensor signals. The first and second photoacoustic signals generated by the first and second microphones 107, 109 may be coupled to a preamplifier before feeding into the A/D converter 340. Using control algorithms (e.g. PID based) implemented in the PU 350, the above-mentioned sensor signals may be processed to provide signals for the control units. Driver electronics transform the output control signals from the PU 350 to appropriate formats. The driver electronics may comprise one or more D/A converters 344 coupled to several array of device drivers 329, 330 comprising valve drivers, laser drivers, laser current drivers etc. The application program or application software may include an algorithm to analyze these data.

The photoacoustic sensor system 200 may be configured to alerting relevant personnel if oil contamination levels are either detected or approaching pre-defined critical limits. The alerting may comprise sound signals, tactile/vibration signals, visual signals and various types of electronic messages such as email messages or SMS messages. The first and second microphone signals and the photodetector signals are preferably captured at accurate time-intervals such as performed by Sigma-Delta type of A/D converters 342, 340. This ensures that the amplitude of the acoustic resonance is digitized with the highest sensitivity. The amplitude of the acoustic resonance can be either quantified by FFT analysis on selected segments of the captured microphone signals or by digital implementation of a Lock-In-Amplifier The performance of both the photoacoustic sensor system 200, the data acquisition and control system 300 and of the optical sensor has been validated by dynamic generation of oil in air at amount of substance levels down to those relevant for ISO 8573 Class 0. Validation criteria included time response, linearity, sensitivity to cross-interferences, reproducibility, repeatability, sensitivity, influence of pressure and temperature.

Figure 8:
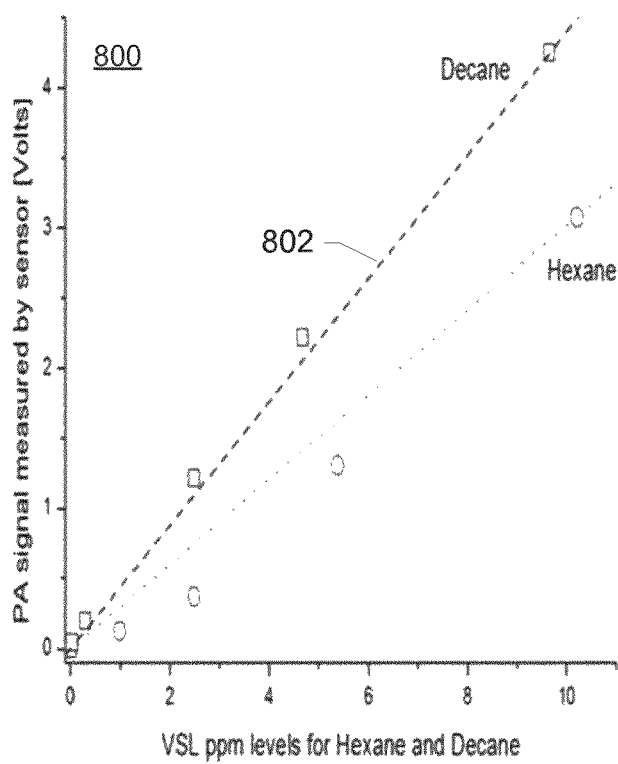
FIG. 8 shows respective measured curves of a relationship between a lock-in amplifier signal and hexane ($C_6H_{14}$) and decane ($C_{10}H_{22}$) concentrations of air samples.

The validation of the photoacoustic sensor system 200 has met or exceeded following criteria:
Sensitivity:

Linearity of the photoacoustic signals to oil concentration providing better than ISO 8573 Class 1 sensitivity and traceability to National Metrology Standards. FIG. 8 shows a linear relationship between the lock-in amplifier signal (depicted on the y-axis of graph 800) and hexane (C6H14) and decane (C10H22) concentrations in the measured air samples (depicted in ppm along the x-axis) with an uncertainty of less than 3% on each measurement. This demonstrates the potential of the sensor system for measuring different ISO classes of oil contamination in compressed air. Note that the fitted curve 802 for the decane measurements has the best linear response. This is attributed to the fact that the decane concentrations were measured within a few hours compared to the hexane concentrations which was measured over 2 days without realignment of the system.

Figure 7:
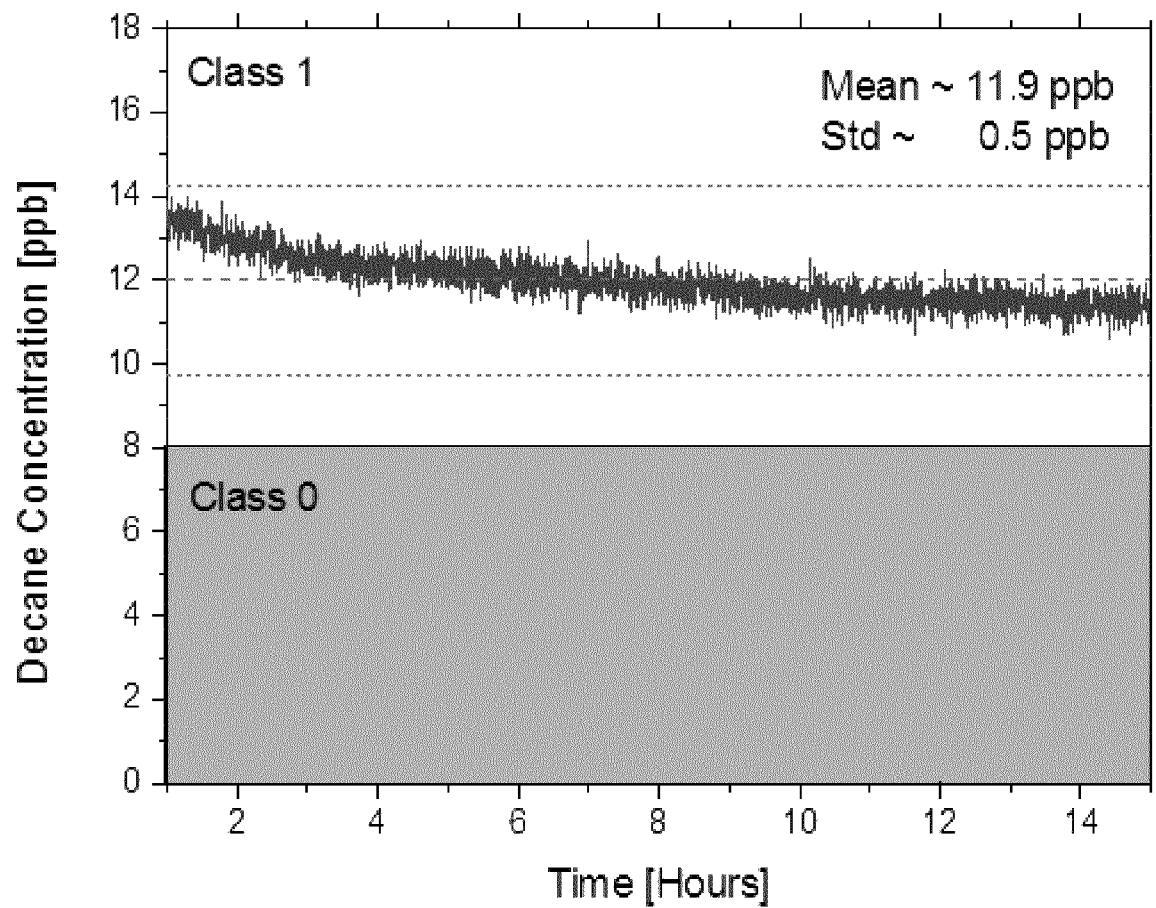
FIG. 7 illustrates measurement accuracy and long-time stability of measurements of decane concentrations performed by a photoacoustic sensor system according to various embodiments of the invention.

The measurement accuracy and long-time stability of the measurement of decane concentrations performed by the photoacoustic sensor system 200 are illustrated by FIG. 7 which shows a measured standard deviation of 0.5 ppb. The measurements demonstrate a Class 1 measurement with a mean of 11.9 ppb and with Class 0 sensitivity. The 11.9 ppb signal response has been estimated from the linearity of the sensor as shown in FIG. 8.

Figure 9:
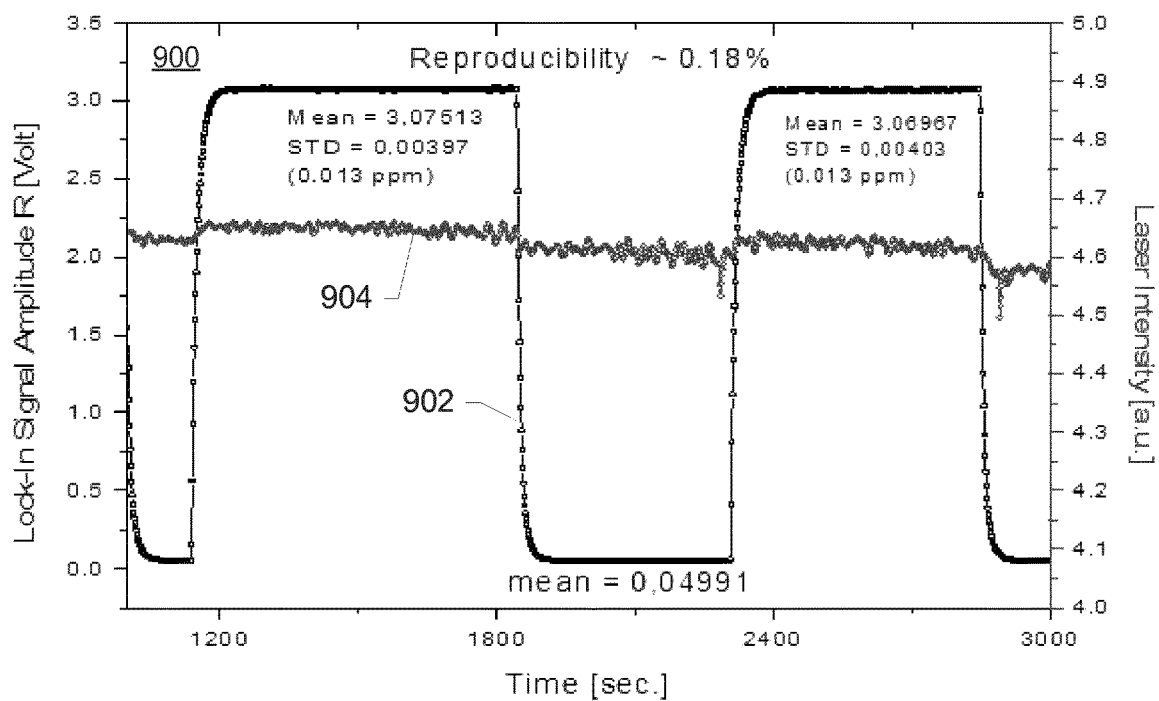
FIG. 9 illustrates measurement reproducibility of measurements of the photoacoustic sensor system for a particular class of oils.

The reproducibility of the photoacoustic output signal, for example represented by the previously discussed subtraction of the first and second photoacoustic signals, at a given class of oil lies within 0.2% from peak to peak as illustrated by curve 902 on graph 900 of FIG. 9. The measured or estimated laser intensity over time is illustrated by curve 904. Repeatability of the background bias signal is also illustrated on FIG. 9 and likewise the immediate response of the sensor system when contamination levels of the air samples change. The reproducibility for a given concentration estimation should preferably not differ more than 2% from a mean concentration over time. The reproducibility of the generated sensor signal lies within 0.2% from peak to peak. It is evident that the time or dynamic response of the sensor system is almost instantaneous demonstrating the suitability for real-time monitoring of the target molecules in question, e.g. decane, and issuing alarms if the concentration of the target molecules exceeds a certain concentration level or threshold.

The invention claimed is:

1. A photoacoustic sensor system for detecting target molecules in air samples or compressed air samples, comprising:
   a photoacoustic spectroscopy cell comprising:
      an acoustic resonator comprising an upper circular plate and a lower circular plate arranged in conjunction and separated by a predetermined distance or height to form a cylindrical resonant cavity,
      an air or compressed air sampling system configured for directing a flow of air or compressed air through the cylindrical resonant cavity; and
      a first microphone arranged substantially at a center of one of the upper and lower circular plates for generating a first photoacoustic signal in response to absorption of modulated light within the cylindrical resonant cavity and a second microphone arranged at a circumferential edge of the one of the upper and lower circular plates for generating a second photoacoustic signal in response to the absorption of modulated light within the cylindrical resonant cavity;
   a light source configured to direct a modulated light beam through the cylindrical resonant cavity of the photoacoustic spectroscopy cell.

2. The photoacoustic sensor system according to claim 1, wherein a modulation frequency of the light source is set to substantially a fundamental resonant mode or frequency of the cylindrical resonant cavity.

3. The photoacoustic sensor system according to claim 1, wherein each of the upper and lower circular plates comprises a silicon plate.

4. The photoacoustic sensor system according to claim 3, wherein each silicon plate is covered by surface passivation layers.

5. The photoacoustic sensor system according to claim 3, wherein each silicon plate is covered by surface passivation layers of $SiO_2$.

6. The photoacoustic sensor system according to claim 1, wherein the photoacoustic spectroscopy cell further comprises:
   an inner cell wall surrounding the acoustic resonator; and
   a first optical window arranged in the inner cell wall for passing the modulated light beam into the photoacoustic spectroscopy cell.

7. The photoacoustic sensor system according to claim 6, wherein the inner cell wall further comprises:
   a second optical window arranged oppositely to the first optical window for passing the modulated light beam to a high reflection mirror, and passing a reflected modulated light beam into the photoacoustic spectroscopy cell, thereby multi-passing a modulated light beam through the cylindrical resonant cavity.

8. The photoacoustic sensor system according to claim 1, further comprising an aspheric lens arranged to collimate the modulated light beam before transmission into the photoacoustic spectroscopy cell.

9. The photoacoustic sensor system according to claim 1, wherein the light source comprises at least one of an LED source or a laser source.

10. The photoacoustic sensor system according to claim 1, wherein the light source is configured for emitting light with a wavelength between 400 nm and 10 μm.

11. The photoacoustic sensor system according to claim 1, wherein the light source comprises a tunable laser source.

12. The photoacoustic sensor system according to claim 1, wherein each of the upper and lower circular plates of the acoustic resonator has a radius between 20 mm and 60 mm; and wherein the predetermined height or distance between the upper and lower circular plates lies between 4 mm and 10 mm.

13. The photoacoustic sensor system according to claim 1, wherein the acoustic resonator is shaped and sized to provide a Q factor larger than 40 at a fundamental resonant mode.

14. The photoacoustic sensor system according to claim 1, wherein the target molecules comprises oil molecules, preferably in aerosol, vapor or liquid form.

15. The photoacoustic sensor system according to claim 1, wherein the target molecules comprises hydrocarbons, preferably $CH_4$.

16. The photoacoustic sensor system according to claim 1, wherein the target molecules comprises exhaust gas molecules, preferably selected from the group of $NO_x$, $SO_x$, $CO_x$.

17. The photoacoustic sensor system according to claim 1, wherein the light source is configured for emitting light with a wavelength between 2.5 μm and 4.5 μm.

18. The photoacoustic sensor system according to claim 1, wherein the acoustic resonator is shaped and sized to provide a Q factor larger than 60 at a fundamental resonant mode.

19. The photoacoustic sensor system according to claim 1, wherein a ratio of the upper and lower circular plates of the acoustic resonator radii to the predetermined distance or height between the upper and lower circular plates lies between 2 and 15.

20. A method of detecting target molecules in air or compressed air samples by photo acoustic spectroscopy, said method comprising:
   a. directing a flow of air or compressed air through a cylindrical resonant cavity of an acoustic resonator, wherein a first and a second circular plate in conjunction form the acoustic resonator,
   b. generating a modulated light beam at a predetermined wave length by a light source,
   c. directing the modulated light beam through the cylindrical resonant cavity of the photoacoustic spectroscopy cell to absorb modulated light in the target molecules,
   d. amplifying sound waves of a photoacoustic signal generated in response to the absorption of the modulated light by excitation of a fundamental resonant mode or frequency of the resonant cavity,
   e. detecting a first sound pressure component of the photoacoustic signal at a first position of the cylindrical resonant cavity, wherein the first position is substantially at a center of a either the first or second circular plate,
   f. detecting a second sound pressure component of the photoacoustic signal at a second position of the cylindrical resonant cavity, wherein the second position is arranged at a circumferential edge of one of the first or second circular plates.

21. The method of detecting target molecules in air or compressed air samples according to claim 16, comprising a further step of:
   g. subtracting the first and second sound pressure components to produce a photoacoustic output signal with enhanced signal-to-noise ratio relative to each of the first and second sound pressure components.

* * * * *